United States Patent
Becker

(10) Patent No.: US 7,835,474 B2
(45) Date of Patent: Nov. 16, 2010

(54) SYSTEM AND METHOD FOR IMPROVED NOISE IMMUNITY IN IMPULSE AND RADAR COMMUNICATIONS SYSTEMS

(75) Inventor: Robert C. Becker, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 1218 days.

(21) Appl. No.: 11/352,827

(22) Filed: Feb. 13, 2006

(65) Prior Publication Data

US 2007/0189425 A1  Aug. 16, 2007

(51) Int. Cl.
*H04L 27/06* (2006.01)

(52) U.S. Cl. .................................... 375/343

(58) Field of Classification Search ........... 375/142, 375/143, 150, 152, 343; 704/216, 218, 237, 704/263; 708/5, 422, 813; 342/108, 145, 342/189, 378

See application file for complete search history.

(56) References Cited

U.S. PATENT DOCUMENTS

| | | | | | |
|---|---|---|---|---|---|
| 4,038,540 | A | * | 7/1977 | Roberts | 708/312 |
| 5,920,496 | A | * | 7/1999 | Kim et al. | 708/422 |
| 6,160,802 | A | * | 12/2000 | Barrett | 370/342 |
| 6,438,187 | B1 | * | 8/2002 | Abbey | 375/368 |
| 6,556,621 | B1 | | 4/2003 | Richards et al. | |
| 7,428,276 | B2 | * | 9/2008 | Yan | 375/343 |
| 2005/0237966 | A1 | * | 10/2005 | Aiello et al. | 370/321 |
| 2006/0039453 | A1 | * | 2/2006 | Yamada | 375/150 |
| 2007/0104297 | A1 | * | 5/2007 | Gorday | 375/343 |

FOREIGN PATENT DOCUMENTS

EP   1503511   2/2005

* cited by examiner

*Primary Examiner*—Sam K Ahn
(74) *Attorney, Agent, or Firm*—Fogg & Powers LLC

(57) ABSTRACT

A method of improving noise immunity in a signal is provided. The method comprises receiving a multi-bit symbol comprised of pulses and absences of pulses, incrementing a correlation count if a pulse is present when a pulse is expected, and decrementing the correlation count if a pulse is present when a pulse is not expected.

22 Claims, 4 Drawing Sheets

SYSTEM AND METHOD FOR IMPROVED NOISE IMMUNITY IN IMPULSE AND RADAR COMMUNICATIONS SYSTEMS

BACKGROUND

Typical impulse communications systems make a number of assumptions. For example, many impulse communications systems assume that the impulse power of the signal will exceed the background noise level sufficiently to provide adequate signal-to-noise ratio for operation. Also, many impulse communications systems assume a quiet spectrum in the frequency band of operation. Typically, very little coding of the signal is done in impulse communications systems. The coding that is typically done is usually error detection and correction rather than coding to ensure signal integrity. One example of error detecting and correcting coding is Reed Solomon coding.

It is not always valid to assume either a quite spectrum or that impulse power will always sufficiently exceed background noise level. For example, impulse noise sources can cause a pulse to be detected when no pulse was transmitted in the original signal. Some systems reject noise by using multi-bit symbols and monitoring for pulses when a pulse is expected. If the pulses received match the pulses expected, the multi-bit symbol is considered a valid symbol. However, it is still possible that, in these systems, noise can cause pulses to be detected when expected even though no pulse was transmitted at that time. When this happens a symbol may be considered a valid symbol even though the symbol is the result of noise and not a transmitted data signal.

For the reasons stated above, and for other reasons stated below which will become apparent to those skilled in the art upon reading and understanding the present specification, there is a need in the art for a communications system which has improved noise immunity.

SUMMARY

The above-mentioned problems and other problems are resolved by the present invention and will be understood by reading and studying the following specification.

In one embodiment, a method of improving noise immunity in a signal is provided. The method comprises receiving a multi-bit symbol comprised of pulses and absences of pulses, incrementing a correlation count if a pulse is present when a pulse is expected, and decrementing the correlation count if a pulse is present when a pulse is not expected.

In another embodiment, a computer program product comprising a computer-usable medium having computer-readable instructions embodied therein for configuring a computer processor is provided. The computer program product comprises first instructions configured to cause a computer processor to compare a received multi-bit symbol comprised of pulses and absences of pulses to an expected pattern of pulses and absences of pulses, second instructions configured to cause a computer processor to increment a correlation count when the received multi-bit symbol matches the expected pattern, third instructions configured to cause a computer processor to decrement the correlation count when the received multi-bit symbol does not match the expected pattern, and fourth instructions configured to cause a computer processor to compare the correlation count to a threshold value.

In yet another embodiment, a communications system is provided. The communications system comprises a transmit device adapted to transmit a multi-bit symbol, the transmit device being adapted to modulate the multi-bit symbols using a pulse-based modulation scheme; and a receiving device adapted to accept the received multi-bit symbol when a correlation count exceeds a threshold value and reject the received multi-bit symbol when the correlation count does not exceed the threshold value, wherein the receiving device increments the correlation count if a pulse is present when expected and decrements the correlation count if a pulse is present when a pulse is not expected.

DRAWINGS

The present invention can be more easily understood and further advantages and uses thereof more readily apparent, when considered in view of the description of the preferred embodiments and the following figures in which.

DETAILED DESCRIPTION

Figure 1:
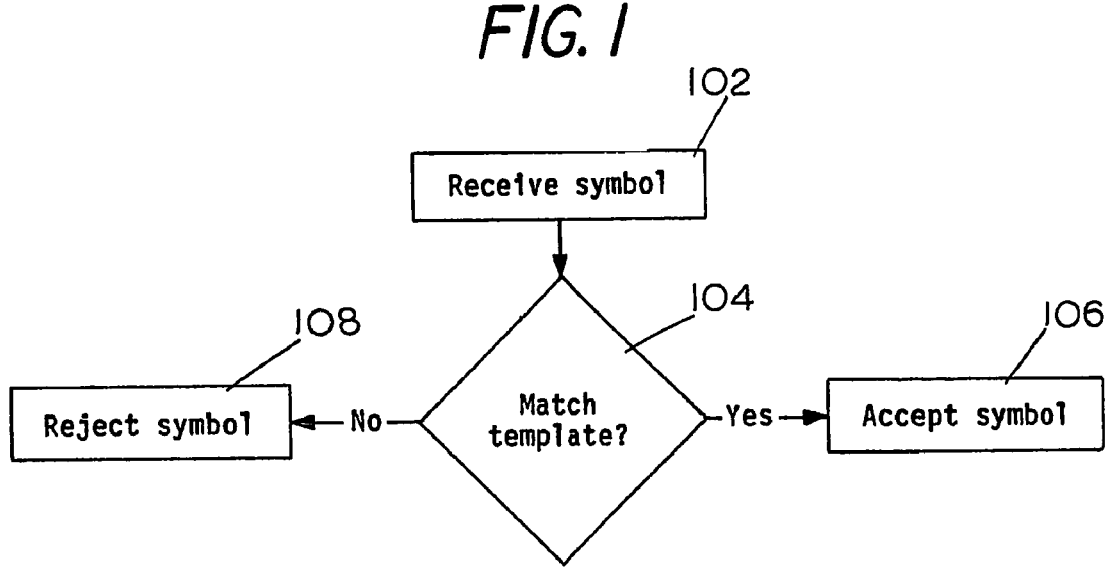
FIG. 1 is a flow chart showing a method of improving noise immunity in a signal according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the methods presented in the drawing figures or the specification are not to be construed as limiting the order in which the individual steps may be performed. The following detailed description is, therefore, not to be taken in a limiting sense.

Embodiments of the present invention enable impulse communication and radar systems to more effectively penetrate noisy environments by improving signal immunity to noise. This is accomplished by using multi-bit symbols to represent logical 1 and logical 0, and by improving correlation of a received symbol pattern with an expected symbol pattern for a particular logical symbol. Although this discussion considers only symbol patterns representing a single logical 1 or logical 0, alternative embodiments are possible where a particular symbol pattern represents combinations of multiple logical 1 and logical 0 symbols.

FIG. 1 is a flow chart showing a method 100 of improving noise immunity in a signal according to one embodiment of the present invention. At 102, a multi-bit symbol comprised of pulses and absences of pulses is received. The pattern of pulses and absences of pulses represents one of a logical one or a logical zero depending on the pattern. The multi-bit symbol is modulated using a pulse based modulation scheme. In some embodiments, the symbol is modulated using a pulse-position modulation scheme. In other embodiments, the symbol is modulated using other pulse based modulation schemes including, but not limited to, pulse-density, pulse-code, pulse-width, and pulse-amplitude modulation schemes. Additionally, in some embodiments, the multi-bit symbol is balanced such that there are a substantially equal number of pulses as absences of pulses in the symbol. This helps prevent biasing detection of one logical state over another (e.g. biasing in favor of detecting a logical zero over a logical one).

At 104, the pattern of pulses and absences of pulses detected in the received symbol is correlated with an expected pattern of pulses and absences of pulses. If the detected pattern matches the expected pattern within a determined level of error, the symbol is accepted as a valid symbol at 106. If the detected pattern of pulses and absences of pulses does not match the expected pattern within the determined level of error, the symbol is rejected as an invalid symbol at 108. Method 100 then returns to 102 to receive additional symbols.

Figure 2:
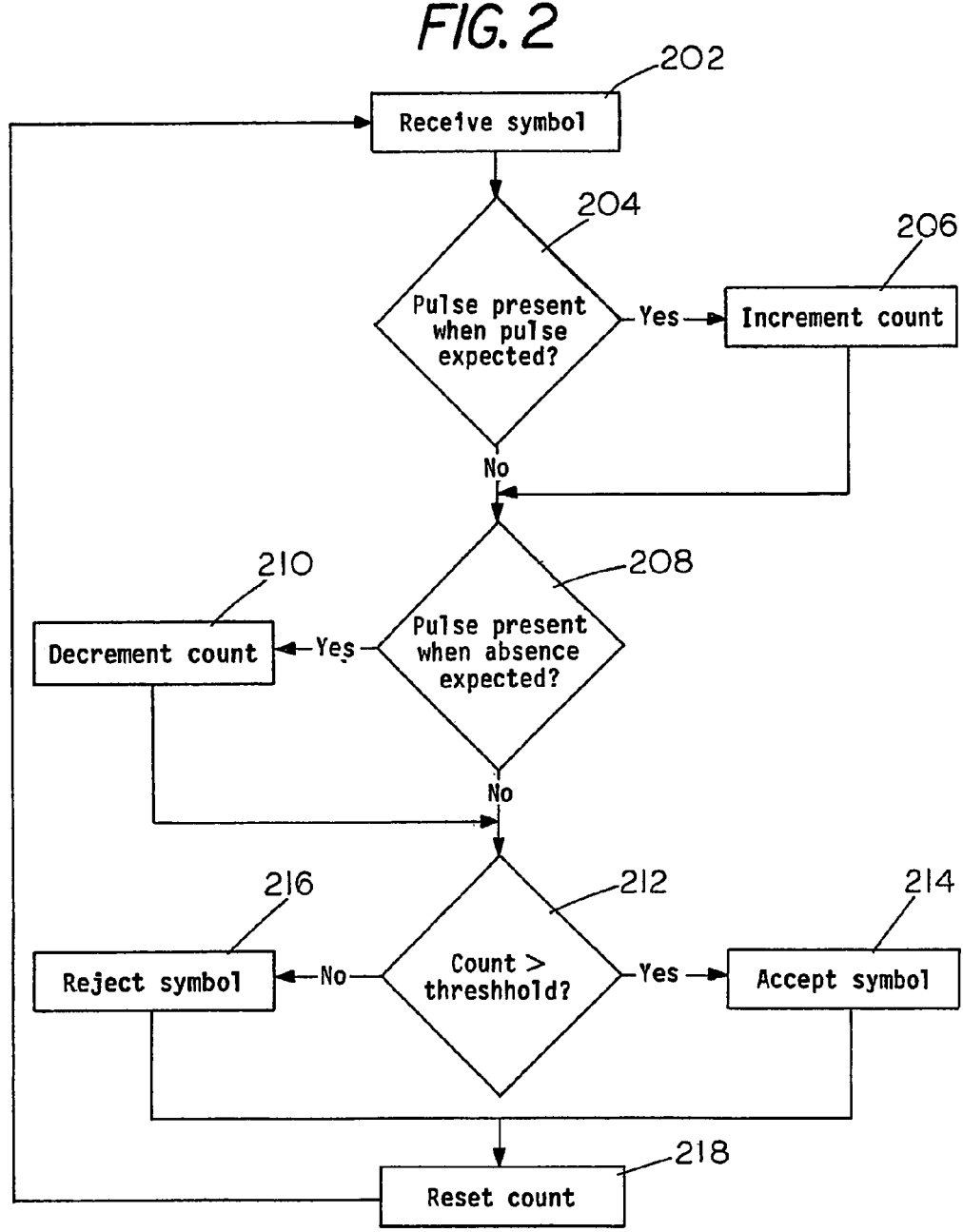
FIG. 2 is another flow chart showing a method of improving noise immunity in a signal according to one embodiment of the present invention.

FIG. 2 is a flow chart showing a method 200 of improving noise immunity in a signal according to one embodiment of the present invention. At 202, a multi-bit symbol comprised of pulses and absences of pulses is received. The pattern of pulses and absences of pulses represents one of a logical one or a logical zero depending on the pattern. The multi-bit symbol is modulated using a pulse based modulation scheme. For example, in some embodiments, the symbol is modulated using a pulse-position modulation scheme. In other embodiments, the symbol is modulated using other pulse based modulation schemes including, but not limited to, pulse-density, pulse-code, pulse-width, and pulse-amplitude modulation schemes. At 204, the pattern of pulses and absences of pulses detected in the received symbol is correlated with an expected pattern of pulses and absences of pulses to determine if pulses are present when pulses are expected. For each pulse that is present when expected, a correlation count is incremented at 206. At 208, the pattern of pulses and absences of pulses detected in the received symbol is correlated with an expected pattern of pulses and absences of pulses to determine if pulses are present when absences of pulses are expected. For each pulse that is present when an absence of a pulse is expected, the correlation count is decremented at 210. At 212, the correlation count is compared to a threshold value. If the correlation count is greater than the threshold value, the symbol is accepted as a valid symbol at 214. If the correlation count is not greater than the threshold value, the symbol is rejected as an invalid symbol at 216. At 218, the correlation count is reset and the method returns to 202 to process another received symbol.

Figure 3:
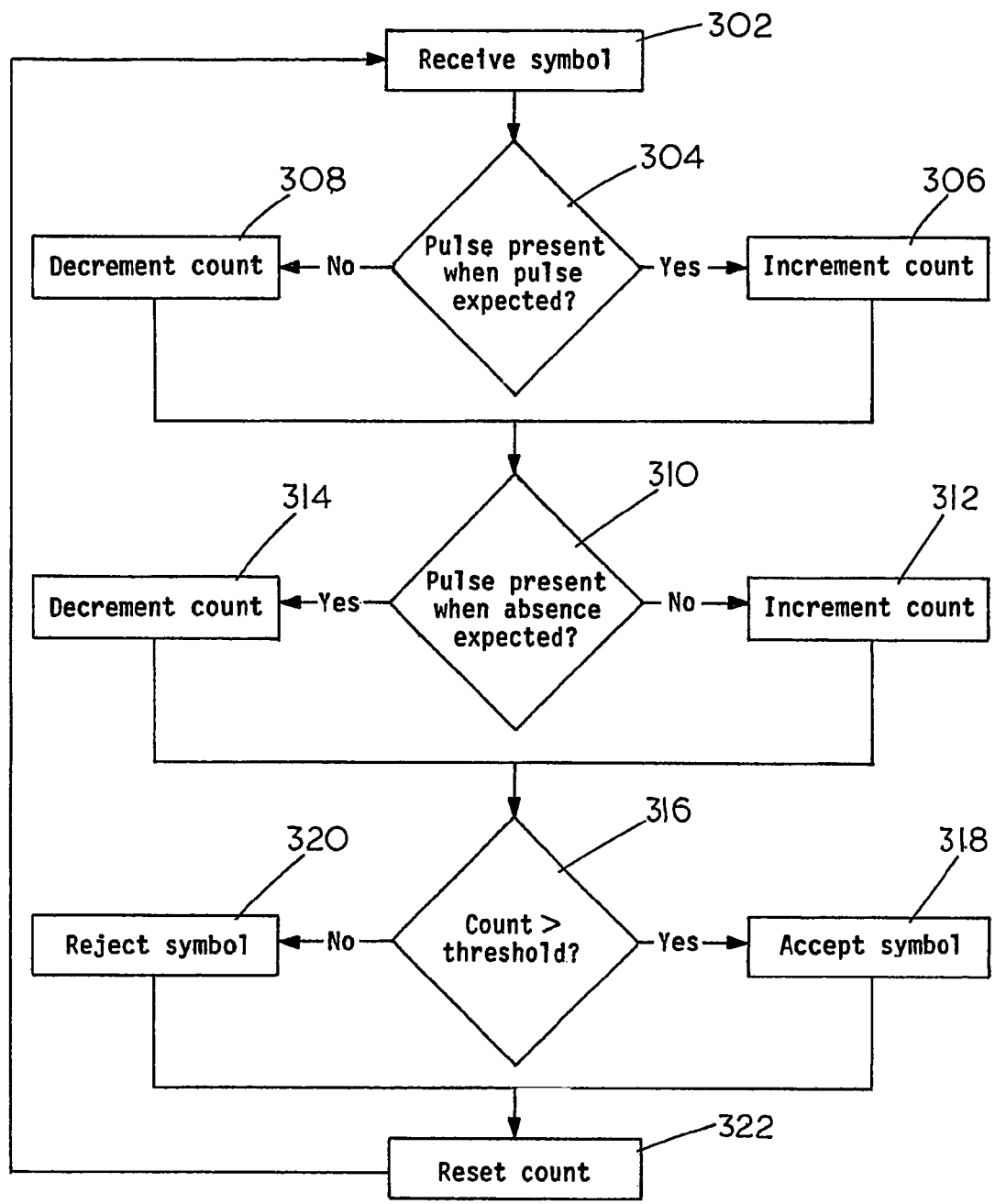
FIG. 3 is another flow chart showing a method of improving noise immunity in a signal according to one embodiment of the present invention.

FIG. 3 is a flow chart showing another method 300 of improving noise immunity in a signal according to one embodiment of the present invention. At 302, a multi-bit symbol comprised of pulses and absences of pulses is received. The pattern of pulses and absences of pulses represents one of a logical one or a logical zero depending on the pattern. The multi-bit symbol is modulated using a pulse based modulation scheme. For example, in some embodiments, the symbol is modulated using a pulse-position modulation scheme. In other embodiments, the symbol is modulated using other pulse based modulation schemes including, but not limited to, pulse-density, pulse-code, pulse-width, and pulse-amplitude modulation schemes. At 304, the pattern of pulses and absences of pulses detected in the received symbol is correlated with an expected pattern of pulses and absences of pulses to determine if pulses are present when pulses are expected. For each pulse that is present when expected, a correlation count is incremented at 306. For each absence of a pulse when a pulse is expected, the correlation count is decremented at 308.

At 310, the pattern of pulses and absences of pulses detected in the received symbol is correlated with an expected pattern of pulses and absences of pulses to determine if pulses are present when absences of pulses are expected (i.e. a pulse is not expected). For each pulse that is present when an absence of a pulse is expected, the correlation count is decremented at 312. For each absence of a pulse when an absence is expected (i.e. a pulse is not present when a pulse is not expected), the correlation count is incremented at 314.

At 316, the correlation count is compared to a threshold value. If the correlation count is greater than the threshold value, the symbol is accepted as a valid symbol at 318. If the correlation count is not greater than the threshold value, the symbol is rejected as an invalid symbol at 320. At 322, the correlation count is reset and the method returns to 302 to process another received symbol.

Figure 4:
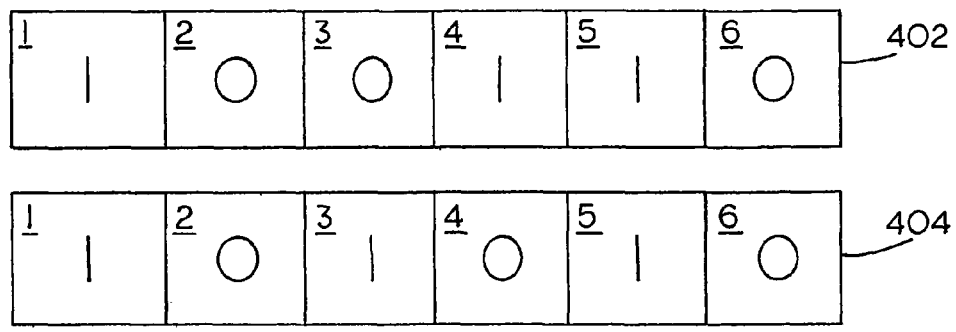
FIG. 4 is a diagram illustrating correlation of a received pattern of pulses and absences of pulses with an expected pattern of pulses and absences of pulses according to one embodiment of the present invention.

FIG. 4 is a diagram illustrating correlation of a received pattern of pulses and absences of pulses 404 with an expected pattern of pulses and absences of pulses 402 according to one embodiment of the present invention. Expected pattern 402 forms a multi-bit symbol representing one of a logical 1 and a logical 0. Correlation of received pattern 404 with expected pattern 402 determines if received pattern 404 also contains the correct pattern to form a multi-bit symbol representing one of a logical 1 and a logical 0. In operation, received pattern 404 is correlated with two expected patterns, one representing a logical one and another representing a logical zero. The two patterns are designed such that received pattern 404 is only able to sufficiently match one of the two patterns. In this manner, it is determined if received pattern 404 is a valid symbol and what logical state is represented by received pattern 404.

The number of bits used in received pattern 404 and expected pattern 402 is fixed. For purposes of explanation only and not by way of limitation, received pattern 404 and expected pattern 402 contain 6 bits in the exemplary embodiment in FIG. 4. However, it will be understood by one of skill in the art that, in operation, any suitable number of bits may be used. Each bit in FIG. 4 contains a "1" representing a pulse or a "0" representing an absence of a pulse. Additionally, in some embodiments, the number of pulses and absences of pulses present in a given symbol are balanced such that there are a substantially equal number of pulses as absences of pulses. This helps prevent biasing correlation in favor of detecting one logical state over another (e.g. favoring a logical 1 over a logical 0).

As shown in the exemplary FIG. 4, expected pattern 402 contains a pulse at locations 1, 4, and 5. Received pattern 404 contains a pulse at locations 1, 3, and 5. Since received pattern 404 has a pulse at locations 1 and 5 as expected, a correlation count is incremented twice. However, since received pattern 404 also has a pulse at location 3 when an absence of a pulse is expected in expected pattern 402, the correlation count is decremented once. Additionally, in some embodiments, the correlation count is incremented twice since received pattern 404 contains an absence of a pulse at locations 2 and 6 as expected in expected pattern 402. Finally, in some embodiments, the correlation count is decremented once since received pattern 404 contains an absence of a pulse at location 4 when a pulse is expected in expected pattern 402.

Incrementing and decrementing the correlation count comprises, in an exemplary embodiment, increasing and decreasing the correlation count by 1, respectively. However, it will be understood by one of skill in the art that incrementing and decrementing the correlation count comprises increasing and decreasing the correlation count by other values. For example, in an alternative embodiment, incrementing and decrementing the correlation count is weighted based on different criteria. In one such alternative exemplary embodiment, the correlation count is incremented by 2 when received pattern 404 has a pulse when expected in expected pattern 402, but only increments the correlation count by 1 when received pattern 404 contains an absence when expected.

Once correlation of received pattern 404 with expected pattern 402 is finished, the total correlation count is compared to a threshold value. If the correlation count is greater than the threshold value, received pattern 404 is accepted as a valid symbol. If the correlation count is not greater than the threshold value, received pattern 404 is rejected as an invalid symbol. In some embodiments, the threshold value is set at a value indicating a perfect match of pulses and absences of pulses between received pattern 404 and expected pattern 402. In other embodiments, the threshold value is set at a value which allows for some variation in location of pulses and absences of pulses between received pattern 404 and expected pattern 402.

Figure 5:
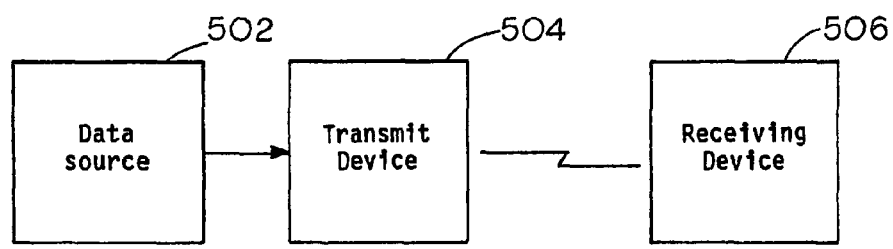
FIG. 5 is a simplified block diagram of a communications system according to one embodiment of the present invention.

FIG. 5 is a simplified block diagram of a communications system 500 according to one embodiment of the present invention. Communication system 500 comprises data source 502, transmit device 504 and receiving device 506. Transmit device 504 receives data from data source 502 and modulates the received data in order to generate a modulated signal that is transmitted by transmit device 504. Transmit device is adapted to modulate the signal using multi-bit symbols to represent logical 1 and logical 0. In some embodiments, transmit device 504 modulates a symbol using a pulse-position modulation scheme. In other embodiments, transmit device 504 uses other pulse-based modulation schemes such as pulse-density, pulse-code, pulse-width, and pulse-amplitude.

Receiving device 506 is adapted to correlate a received symbol with an expected pattern, as described above, and to accept a symbol if a correlation count is greater than a threshold value. For example, receiving device 506 is adapted to increment the correlation count if a pulse is present in a received symbol when expected and to decrement the correlation count if a pulse is present when not expected (i.e. a pulse is present when an absence is expected). Additionally, in some embodiments, receiving device is adapted to increment the correlation count if a pulse is not present when not expected (i.e. an absence of a pulse is present when an absence is expected) and to decrement the correlation count if an absence of a pulse is present when a pulse is expected.

In addition, in some embodiments, receiving device 506 is also adapted to modulate and transmit a multi-bit symbol to transmit device 504. In such embodiments, transmit device 504 is also adapted to correlate a received symbol with an expected pattern, as described above. A device so adapted as to embody both a transmitter and receiver is generally referred to as a transceiver. In an exemplary embodiment, transmit device 504 and receiving device 506 communicate via a wireless link. In alternative embodiments, transmit device 504 and receiving device 506 are adapted to transmit and receive signals over other media such as optical fiber, coaxial cable, and twisted pair copper wire.

Figure 6:
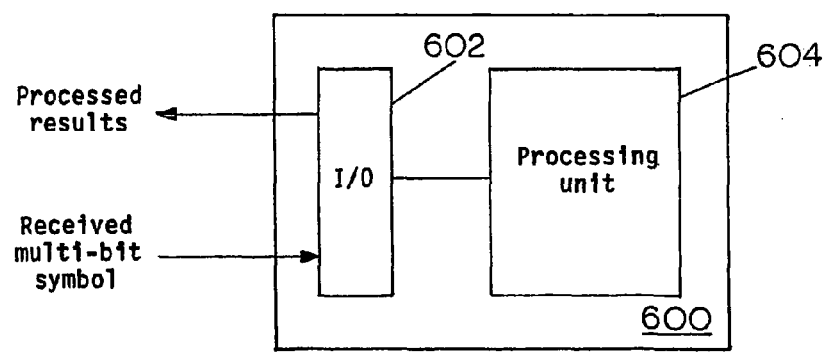
FIG. 6 is a simplified block diagram of a receiving device according to one embodiment of the present invention.

FIG. 6 is a simplified block diagram of a receiving device 600 according to one embodiment of the present invention. Receiving device 600 includes input/output interface 602 and processing unit 604. Input/output interface 602 inputs the received symbol and outputs the result of processing the received symbol with processing unit 604. For example, when a received multi-bit symbol is rejected, a multiplicity of possible actions may be taken by the processing unit. Exemplary actions that may be taken by the processing unit are to cause the input/output interface to ignore the errant (i.e. rejected) symbol, to output an indication of an errant symbol, and/or to send a signal to another device, such as the transmit device which transmitted the symbol, indicating that the multi-bit symbol is rejected.

In some embodiments, processing unit 604 is implemented as an application specific integrated circuit for performing methods and techniques of correlating a received multi-bit symbol comprised of pulses and absences of pulses with an expected pattern, as described above. In other embodiments, processing unit 604 is implemented as a field programmable gate array adapted to perform methods and techniques of correlating a received multi-bit symbol with an expected pattern, as described above. In yet other embodiments, processing unit 604 is implemented as a general purpose programmable processor, such as a computer.

Processing unit 604 includes or interfaces with hardware components and circuitry that support the correlation of a received symbol as described above. By way of example and not by way of limitation, these hardware components include one or more microprocessors, memories, storage devices, interface cards, and other standard components known in the art. Additionally, processing unit 604 includes or functions with software programs, firmware or computer readable instructions for carrying out various methods, process tasks, calculations, control functions, used in the correlation of a received multi-bit symbol as described above. The computer readable instructions, firmware and software programs are tangibly embodied on any appropriate medium used for storage of computer readable instructions including, but not limited to, all forms of non-volatile memory, including, by way of example and not by limitation, semiconductor memory devices, such as EPROM, EEPROM, and flash memory devices; magnetic disks such as internal hard disks and removable disks; magneto-optical disks; and DVD disks. As stated above, any of the foregoing may be supplemented by, or incorporated in, specially-designed application-specific integrated circuits (ASICs) and field programmable gate arrays (FPGAs).

In some embodiments, the methods of correlating a received multi-bit symbol as described above are implemented, at least partially, in software by programming one or more programmable processors to carry out the processing of the correlation methods. The software comprises program instructions that are embodied on a medium from which the program instructions are read by a programmable processor in connection with execution of the program instructions by the programmable processor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of improving noise immunity in a signal representing communication or radar data, the method comprising:
   receiving at a communications system, comprising a receive device, a multi-bit symbol comprised of pulses and absences of pulses, wherein the multi-bit symbol represents communication or radar data;
   incrementing a correlation count if a pulse is present when a pulse is expected; and
   decrementing the correlation count if a pulse is present when a pulse is not expected.

2. The method of claim 1, further comprising:
   comparing the correlation count to a threshold value;
   accepting the symbol if the correlation count is greater than the threshold value; and
   rejecting the symbol if the correlation count is less than the threshold value.

3. The method of claim 1, further comprising:
   incrementing the correlation count if a pulse is not present when a pulse is not expected.

4. The method of claim 1, further comprising:
   decrementing a counter if a pulse is not present when a pulse is expected.

5. The method of claim 1, further comprising:
   balancing the multi-bit symbol such that there are a substantially equal number of pulses as absences of a pulse in the multi-bit symbol.

6. The method of claim 1, wherein receiving a multi-bit symbol further comprises receiving one of a pulse-position modulated symbol, a pulse-code modulated symbol, a pulse-width modulated.

7. A computer program product, comprising:
   a non-transitory computer-usable medium having computer-readable instructions embodied therein for configuring a computer processor, the computer program product comprising:
      first instructions configured to cause a computer processor to compare a received multi-bit symbol comprised of pulses and absences of pulses to an expected pattern of pulses and absences of pulses;
      second instructions configured to cause a computer processor to increment a correlation count when the received multi-bit symbol matches the expected pattern;
      third instructions configured to cause a computer processor to decrement the correlation count when the received multi-bit symbol does not match the expected pattern; and
      fourth instructions configured to cause a computer processor to compare the correlation count to a threshold value.

8. The computer program product of claim 7, wherein instructions configured to cause a computer processor to increment a correlation count further comprises:
   instructions configured to cause a computer processor to increment the correlation count if a pulse is detected when a pulse is expected.

9. The computer program product of claim 7, wherein instructions configured to cause a computer processor to increment a correlation count further comprises:
   instructions configured to cause a computer processor to increment the correlation count if a pulse is not detected when a pulse is not expected.

10. The computer program product of claim 7, wherein instructions configured to cause a computer processor to decrement a correlation count further comprises:
    instructions configured to cause a computer processor to decrement the correlation count if a pulse is not detected when a pulse is expected.

11. The computer program product of claim 7, wherein instructions configured to cause a computer processor to decrement a correlation count further comprises:
    instructions configured to cause a computer processor to decrement the correlation count if a pulse is detected when a pulse is not expected.

12. The computer program product of claim 7, wherein instructions configured to cause a computer processor to compare the correlation count to a threshold value further comprises:
    instructions configured to cause a computer processor to output a signal when the correlation count is less than the threshold value indicating that the received multi-bit symbol is rejected; and
    instructions configured to cause a computer processor to output a signal when the correlation count is greater than the threshold value indicating that the received multi-bit symbol is accepted.

13. A communications system, comprising:
    a transmit device adapted to transmit a multi-bit symbol, the transmit device being adapted to modulate the multi-bit symbols using a pulse-based modulation scheme; and
    a receiving device adapted to accept the received multi-bit symbol when a correlation count exceeds a threshold value and reject the received multi-bit symbol when the correlation count does not exceed the threshold value, wherein the receiving device increments the correlation count if a pulse is present when expected and decrements the correlation count if a pulse is present when a pulse is not expected.

14. The communications system of claim 13, wherein the receiving device comprises:
    a processing unit adapted to compare the received multi-bit symbol to an expected pattern of pulses and absences of pulses, wherein the processing unit is further adapted to increment the correlation count for each occurrence of a pulse in the received multi-bit symbol when a pulse is expected in the expected pattern and to decrement the correlation count for each occurrence of a pulse in the received multi-bit symbol when a pulse is not expected.

15. The communications system of claim 13, wherein the receiving device is further adapted to increment the correlation count when a pulse is not detected when not expected.

16. The communications system of claim 13, wherein the receiving device is further adapted to decrement the correlation count when a pulse is not detected when expected.

17. The communications system of claim 13, wherein the transmit device is adapted to balance the multi-bit symbol such that there are a substantially equal number of pulses and absences of pulses in the multi-bit symbol.

18. The communications system of claim 13, wherein the transmit device is adapted to modulate the multi-bit symbol using one of a pulse-position modulation scheme, a pulse-code modulation scheme, a pulse-width modulation scheme, a pulse-amplitude modulation scheme, and a pulse-density modulation scheme.

19. A communications system, comprising:
    means for transmitting a multi-bit symbol comprised of pulses and absences of pulses; and means for receiving the multi-bit symbol, wherein the means for receiving the multi-bit symbol increments a correlation count when a pulse is present when a pulse is expected and decrements the correlation count when a pulse is present when a pulse is not expected.

20. The communications system of claim 19, wherein the means for transmitting the multi-bit symbol is adapted to modulate the multi-bit symbol using one of a pulse-position modulation scheme, a pulse-code modulation scheme, a pulse-width modulation scheme, a pulseamplitude modulation scheme, and a pulse-density modulation scheme.

21. The communications system of claim 19 wherein the means for receiving the multi-bit symbol is adapted to increment the correlation count when a pulse is not detected when not expected.

22. The communications system of claim 19, wherein the means for receiving the multi-bit symbol is adapted to decrement the correlation count when a pulse is not detected when expected.

* * * * *